Jan. 14, 1964  R. A. CHURCH  3,117,723
AIR DISTRIBUTING UNITS
Filed Nov. 20, 1961  2 Sheets-Sheet 1

*INVENTOR.*
RICHARD A. CHURCH
BY *Seymour Rothstein*
ATTORNEY.

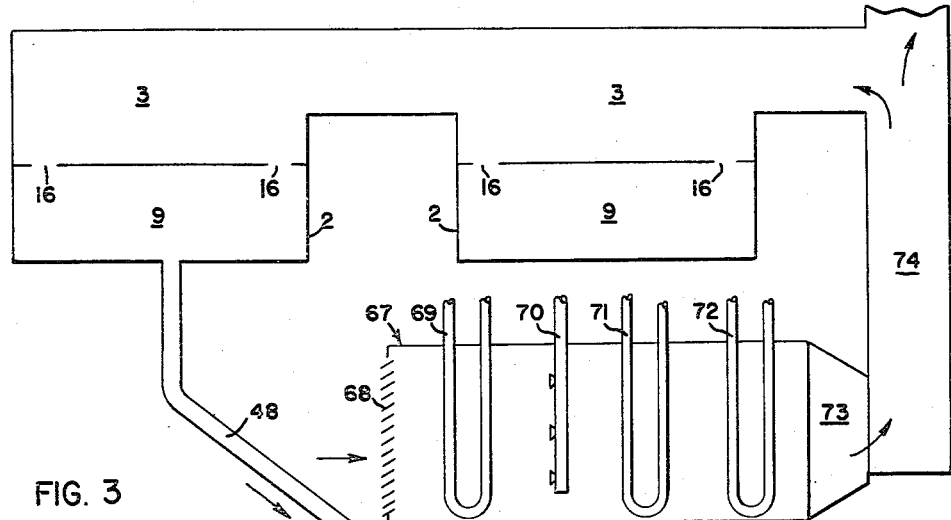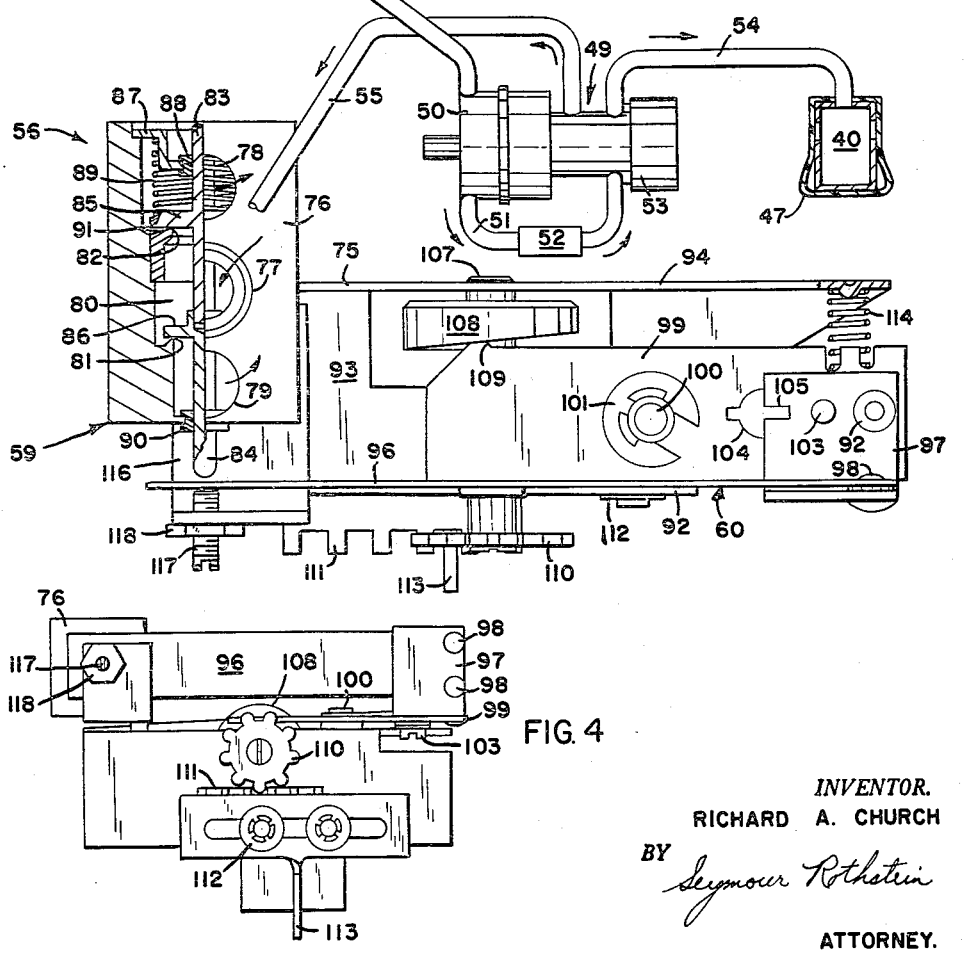

United States Patent Office 3,117,723
Patented Jan. 14, 1964

3,117,723
AIR DISTRIBUTING UNITS
Richard A. Church, North Syracuse, N.Y., assignor to Carrier Corporation, Syracuse, N.Y., a corporation of Delaware
Filed Nov. 20, 1961, Ser. No. 153,345
5 Claims. (Cl. 236—49)

This invention relates to air distributing units and, more particularly, to an air distributing unit incorporating a bladder damper for varying a discharge outlet into an area to be treated and an improved control therefor. The control comprises a precision bleed-type control valve having an actuator therefor responsive to predetermined temperature conditions in the area to be treated.

In copending application, Serial No. 824,053, filed June 30, 1959, now Patent No. 3,082,676, in the names of Richard A. Church, Joseph Blanchette, and James H. Paris, entitled "Air Distributing Unit," there is disclosed an air conditioning system including an air distributing unit for the interior zones of buildings. As stated therein, these interior zones have heretofore been considered as constant load areas. In reality, minor changes in load occur, frequently resulting in inadequate air conditioning of such zones.

The present invention is concerned with a unit of the type described in the above-noted copending application which incorporates improved control means comprising regulator means preferably utilizing conditioned air to actuate the bladder damper and a thermally-responsive control valve for venting conditioned air from the regulator means to regulate the bladder damper.

Within the regulator means are a pair of variable orifice means, the first being fixed but adjustable, the second varying in accordance with plenum chamber pressure or other pressure. The regulator means function over a large pressure range and incorporate therein a power mechanism for varying one of the variable orifice means. Adjustment means are provided for simultaneously varying the orifice means. A presently preferred form of regulator means is more fully described in the copending commonly assigned application, Serial No. 127,243, filed by Richard A. Church and Boris W. Haritonoff on July 27, 1961.

In use, it has been found that variations in pressure within the main supply duct were reflected in inaccuracies in the quantity of air discharged from the bleed-type control valve. As a consequence the bladder damper was not positioned with the precision desired for temperature control.

An object of this invention is to provide an air distributing unit having novel controls for regulating air discharge with precision independent of variations in control air pressure.

Another object of this invention is to provide an air distributing unit including a bladder damper with an improved control means comprising novel temperature-responsive means for venting the bladder damper.

Still another object of this invention is to provide an air distributing unit including a bladder damper with an improved bleed-type control valve operable in response to predetermined conditions within the area to be treated for venting the bladder damper.

Yet another object of the present invention is to provide a precision bleed-type control mechanism having valve means therein which are operable in response to predetermined conditions, movement of the valve means being independent of the forces of the control air upon the valve means. Other objects of this invention will be more readily perceived from the following description.

This invention relates to an air distributing unit for discharging conditioned air into an area to be treated. The unit comprises the combination of a plenum chamber, means for supplying conditioned air to the plenum chamber, means defining an outlet from the plenum chamber into the area to be treated, a damper arrangement comprising a control chamber and a bladder member enveloping at least a portion of the wall of the control chamber, means for supplying conditioned air from the plenum chamber to the control chamber at a pressure less than plenum chamber pressure, means for supplying conditioned air from the control chamber to the space between the bladder member and the wall of the control chamber, and means responsive to predetermined conditions in the area to be treated for venting the control chamber. The venting means preferably comprises a casing having an inlet means in communication with the control chamber and outlet means, valve means in the casing between the inlet means and outlet means for controlling the discharge of air through the outlet means independent of variations in plenum chamber pressure and thermally-responsive actuating means for moving the valve means.

This invention further relates to a bleed-type control mechanism comprising a housing having a passage therein, the housing having inlet means adapted to be connected to a source of control air, means in the housing communicating the passage to the ambient surrounding the housing, valve means in the passage for regulating the discharge of control air through the communicating means and temperature responsive means for actuating the valve means, the valve means being constructed and arranged to neutralize the forces of the control air upon the valve means so that the valve means are movable by the temperature-responsive means to bleed control air to the ambient.

The invention will be particularly pointed out in clear, concise and exact terms in conjunction with the accompanying drawing of the invention in which:

FIGURE 3 is a diagrammatic view of an air conditioning system showing the preferred control system for each zone to be treated, the temperature-responsive means of the control system being in enlarged scale and partially in section;

FIGURE 4 is a bottom view of the temperature-responsive means of FIGURE 3.

Figure 1:
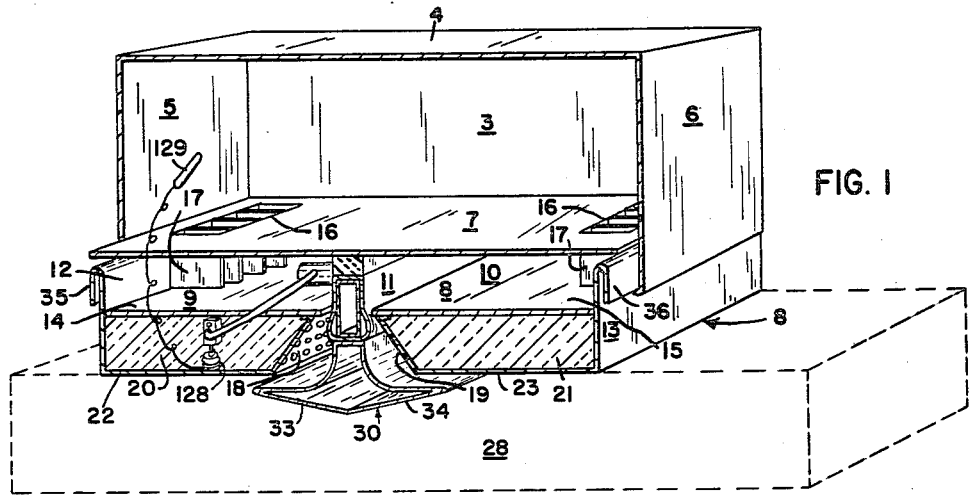
FIGURE 1 is a perspective view, partly in section, illustrating an air distributing unit.

Referring to the drawing, FIGURE 1 discloses a perspective view, partly in section of an air distributing unit 2. This unit includes a conduit section 3 which is defined by top wall 4 and side walls 5 and 6. The conduit section 3 has a lower wall 7 which separates the conduit section from the air distributing section 8.

The air distributing section 8 comprises plenums 9 and 10 which are located on opposite sides of a bladder damper 11. The plenum 9 is defined by the extension of wall 12, wall 7 and the lower wall 14. Similarly, the plenum 10 is defined by the wall 7, the extension of the wall 13 and lower wall 15. In order to pass conditioned air from the conduit section 3 into the plenums 9 and 10, suitable openings 16 are spaced along the edges of the wall 7 adjacent the junctures of the wall 7 with the walls 5 and 6. Associated with these openings 16 are a plurality of deflecting vanes 17 which extend into the plenums 9 and 10. These vanes perform a diffusing action and substantially remove the velocity components from the air in the conduit 3 and convert it substantially to static pressure within the plenums 9 and 10. It will be appreciated these vanes may be omitted, if desired.

Figure 2:
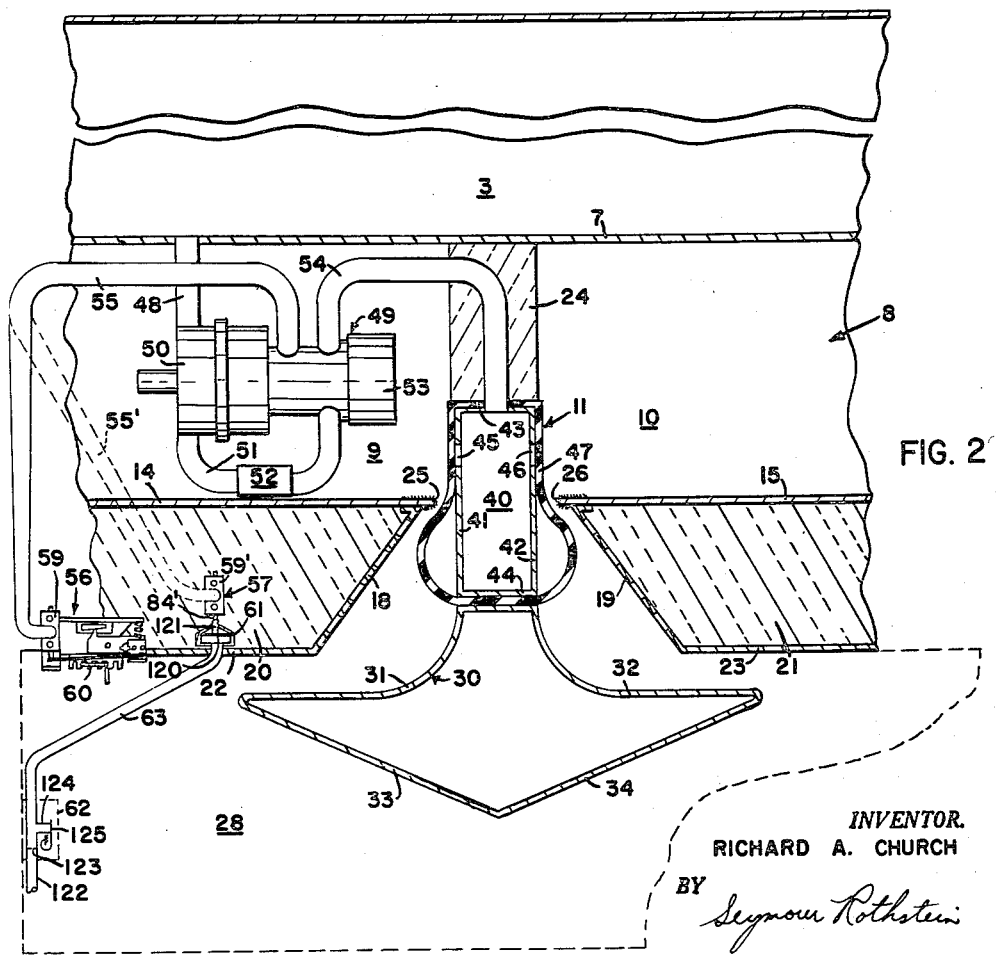
FIGURE 2 is an enlarged sectional view of the air distributing unit illustrating a preferred temperature-responsive control and an alternative temperature-responsive control.

As seen in FIGURE 2, the air is discharged from the plenums 9 and 10 through the longitudinal openings defined by the edges 25 and 26 of the walls 14 and 15 and the opposite edges defined by the bladder damper 11. This bladder damper will be described more fully hereinafter.

As the air passes from each of the penums, the air is expanded adjacent the angular walls 18 and 19. These walls may be suitably perforated, placing the discharge side of the longitudinal outlets from the plenums into communication with the silencing chambers 20 and 21. The chamber 20 is defined by the walls 12, 14, 22, and the perforated section 18. The second silencing chamber 21 is defined by the walls 13, 15, 23 and the perforated section 19. These chambers may be filled with suitable sound-absorbing material, such as glass wool.

The bladder damper 11 may be connected to the wall 7 by means of a suitable filler piece 24 to maintain separate plenums 9 and 10. It will be appreciated, that the filler piece may be omitted, thus providing a single plenum, if desired, for certain applications.

A suitable deflector 30 may be suspended from the lower portion of the bladder damper 11 to deflect the air discharged from the respective plenums into area 28 in a general horizontal direction substantially parallel to the walls 22 and 23. The deflector may consist of two surfaces 31 and 32 which perform a turning function and also provide two longitudinal slots. For the purpose of maintaining low noise levels, these surfaces 31 and 32 may be flocked. It will be obvious that the surfaces 31 and 32 might be recessed and that a suitable insulation, as for example, glass fibers might be placed in the recesses to similarly maintain low noise levels. The lower portion of the illustrated deflector comprises two angularly disposed planar surfaces 33 and 34.

Very often it is desired that these units be continuous throughout the length of an area. In other situations it may be desirable to separate these units. For this reason, the conduit section 3 is usually supplied in a three-sided construction with the open lower end being provided with bent sections (not shown). These bends extend toward the interior of the conduit and are intended to either fit closing members or to engage the bent portions of the air distributing section 8, especially the walls 12 and 13 thereof which have outwardly bent portions 35 and 36 adapted to engage the conduit section 3.

Referring to FIGURE 2, there is shown an enlarged view of the bladder damper with a control which may be utilized therewith. It will be noted that the walls 14 and 15 which define the lower portion of the plenums 9 and 10 extend beyond the juncture point with the walls 18 and 19. These edges form sealing edges 25 and 26 adapted to coact with the bladder damper to throttle the air passing from the plenum chambers. For the purpose of noise reduction, a suitable covering, as for example, felt or flock, is affixed to the edges 25 and 26. The bladder damper includes a chamber 40 which has a generally parallelepiped shape defined by the walls 41, 42, 43 and 44. Covering these walls which form the chamber 40 is a suitable fabric envelope 47 which comprises the bladder of the damper. The fabric may consist of a cloth impregnated with a suitable elastomer material, such, as a nylon fabric coated or impregnated with neoprene or a polymerized butadiene.

To actuate the bladder to cooperate with the edges 25 and 26 of the walls 14 and 15, suitable openings 45 and 46 are spaced in the walls 41 and 42. These openings are located in the upper portion of the chamber 40, specifically in the portion of the bladder damper which extends into and at least partially defines wall portions of the plenums 9 and 10. It is intended that a control pressure be introduced into the control chamber 40, this control pressure being normally a pressure less than the pressure existing within the conduit 3 and the plenums 9 and 10. It is intended that the control fluid will pass through the openings 45 and 46 and be metered between the bladder 47 and the surfaces 41 and 42 adjacent the openings 45 and 46.

In physically providing the ports 45 and 46, it should be done in a manner so as not to provide positive sealing surfaces between the wall sections 41 and 42 which lie adjacent these ports, for it is intended that the fluid passing from the chamber 40 be able to pass toward the lower portion of the damper in such a manner as to permit restricted deflation and inflation of the lower portion of the damper in a manner to be described hereinafter.

The upper portion of the bladder will be maintained in substantial surface contact with the surfaces 41 and 42. However, as the air passes through the longitudinal openings defined by the edges 25 and 26 of the walls 14 and 15, and the bladder damper, the air will be expanded thereby decreasing its pressure. The lower portion of the bladder damper will be at a higher pressure than the adjacent air causing the lower portion of the bladder to inflate. This inflated bladder will cooperate with the edges of the walls 14 and 15 throttling the air passing from the plenums 9 and 10.

It will be appreciated that because of the particular construction of the bladder and the inherent metering function performed by the bladder coacting with the area adjacent ports 45 and 46, air may be metered into the lower portion of the bladder providing stability in operation and avoiding the common defect of bladder dampers, namely a fluttering action. This fluttering action which is normally experienced in bladder dampers contributes to poor control and also excessive noise resulting in making the damper inadequate for use.

The control mechanism for air distributing unit 2 is shown schematically in FIGURES 2 and 3. Line 48 extends from plenum 9 and is connected to the actuator portion 50 of pressure-responsive valve 49. Regulator means or pressure-responsive valve 49 is preferably of the type described in application, Serial No. 127,243, filed on July 27, 1961 by Richard A. Church and Boris W. Haritonoff. Line 51 interconnects actuator portion 50 of the pressure-responsive valve with regulator portion 53. Disposed in line 51 is a filter 52 made from a suitable material, as for example, porous bronze. Line 54 connects the regulator portion 53 of the valve to the envelope member 47 which comprises the control fluid chamber of the bladder damper 11. A preferred means 56 for controlling the venting of air from line 55 is shown in FIGURES 2 and 3. Such means are mounted on the ceiling proximate the valve 49 to minimize pressure losses which might otherwise occur in line 55. An alternative venting means 57 connected to valve 49 by line 55' is illustrated in FIGURE 2. The venting means will be described in detail hereafter.

Referring to FIGURE 3, there is shown a schematic view of the control system for the damper shown in FIGURES 1 and 2. Air is supplied to each air distributing unit 2 from a central station 67. It will be understood that one or more units 2 may be provided in each area to be treated. Central station 67 includes suitable louvered openings 68 for permitting air to enter the station. Within the central station are heat exchange means, such as, preheater coil 69, a humidifier or dehumidifier comprising spray header 70 and coil 71, and reheater coil 72 for conditioning the air. One or more of the components may be employed to condition the air as required. Air is induced into the central station 67 through the louvered openings 68 by means of a high pressure fan 73 which discharges into main supply duct 74. From duct 74 the air passes to each air distributing unit 2. The air passes from duct 74 into conduit section 3, through openings 16 into plenum chambers 9 and 10.

Considering FIGURE 3, it can be seen that the preferred venting means comprise control valve 59 and thermally-responsive actuator 60 which are mounted on a common frame 75. The valve, which comprises one of the features of this invention, includes valve body 76 having therein passage 80 which is in communication with inlet means 77 and outlet means 78, 79. Provided in the passage 80 are ports or valve seats 81 and 82.

Valve means 83 are disposed within passage 80 for regulating the discharge of control air from the inlet 77 through outlet means 78, 79. Such valve means 83 comprises a spindle 84 to which is connected valves 85 and 86.

Within the cap 87 which closes one end of passage 80, there is secured a bearing 88. In the other end of the passage 80 there is provided bearing 90. Thus it can be seen that spindle 84 is supported at each end of passage 80 by the bearings 88 and 90.

Means are provided for urging the valve members 85 and 86 to their port closing position. Such means comprise spring 89 disposed about spindle 84 and acting between cap 87 and flange 91 on the spindle.

Frame 75 upon which the control valve 59 and thermally-responsive actuator 60 are secured, comprises base portion 92, upright wall 93 and top wall 94. Valve body 76 is secured to upright wall 93 by suitable fastening means.

Actuator 60 comprises a bimetallic element 96 cantilevered from angle member 97. Element 96 is fastened to the angle member by fastening means 98, preferably rivets. The angle member is adjustably secured to support 99 which is pivotally mounted on shaft 100 extending from upright wall 93. The support is secured on shaft 100 by retainer 101.

The means for adjustably mounting the angle member with respect to the support comprise rivet 92 upon which angle member 97 may be pivoted and set screw 103 for securing angle member 97 in position with respect to support 99. To accomplish the adjustment, the set screw 103 is loosened and a screw driver or other suitable tool is positioned in keyhole slot 104 in support 99. The tool is inserted into the recess 105 in the angle member and rotated to the desired position, then the set screw 103 may be tightened down and the tool removed.

Means are provided for manually adjusting the support 99 with respect to the frame 75. Shaft 107 is supported in an upright position by base portion 92 and top wall 94. Cam 108 connected on shaft 107 engages cam follower 109 on support 99. Also mounted on shaft 107 is gear 110. The gear is engaged by a rack 111 movably connected to base portion 92 of frame 75 by suitable retainers 112. The tab or projection 113 on the rack 111 may be manually actuated. Spring 114 acts between the top wall 94 and support 99 to maintain cam 108 and cam follower 109 in engagement.

Mounted upon bracket 116 which is secured to frame 75 are means for limiting the movement of the bimetal. Such means comprise adjusting screw 117 and lug nut 118 for fixing the adjusting screw in the properly adjusted position.

Considering FIGURE 2 again, there is shown both a preferred means 56 for venting control air and a modified venting means 57. The modified venting means comprise a valve 59', which is in all respects the same as the valve 59. The thermally-responsive means for controlling the position of spindle 84' is different. In the modified arrangement the actuator is pneumatically controlled. Within the actuator or pneumatic relay 61 there is a diaphragm 120 movable in response to pressure change within the relay. The diaphragm is operably connected to stem 121 which is in engagement with spindle 84' of control valve 59'. Line 63 connects the pneumatic relay with wall-mounted thermostat 62.

Thermostat 62 comprises an inlet 122 which is in communication with a source of control air. The thermostat may be of the bleed-port type, for example, Model TP-910A, manufactured by Minneapolis-Honeywell Regulator Company. Downstream of the inlet there is provided a fixed orifice 123 for limiting the flow of air supplied to the pneumatic relay. The throttling of control air through bleed port 124 is regulated by bimetal 125, operable in response to temperature variation in the area 28 to be treated.

The preferred means 56 for venting control air are mounted on the ceiling proximate the air distributing unit. It is preferable for best operation of the control that the line 55 connecting regulator means 49 with the venting means 56 be as short as possible to overcome the adverse effects of a large pressure drop due to friction within the line 55.

The modified venting means 57 may be used when it is desired to employ a wall-type thermostat. Bimetal 125 is preferably adjustable so that the occupant of each area 28 may suitably adjust the conditions within the area.

It will be understood from the foregoing that one or more air distributing units 2 may be provided in each area 28 to be treated and that a control mechanism including a bleed-type valve and a thermally-responsive actuator may be provided for each air distributing unit or for one or more air distributing units within an area to be treated.

Operation

Air is drawn into central station 67 through rain-proof louvered opening 68. Suitable filters (not shown) remove the entrained dust and dirt particles. In winter, the air is tempered by preheater 69 so that it has the capacity to absorb moisture when passing through the spray from header 70. Coil 71 removes excess moisture from the air during warm, humid weather or the spray from header 70 may add moisture for winter humidification. During intermediate season operation, reheater 72 may warm the air to offset building transmission losses. It will be understood that the reheater is not required for interior zone application. The high pressure centrifugal type fan 73 delivers the conditioned air through supply duct 74 to the air distributing units in each area 28. From duct 74 the air passes into the conduit section 3 of each air distributing unit 2 into the plenum chambers thereof.

A portion of the air passes from line 48 to the regulator means 49. Control pressure is transmitted to bladder 47 from regulator means 49 through line 54. Some air passes from regulator means 49 through line 55 to control valve 59 of the vent control means.

Valve means 83 within valve body 76 are moved by bimetal 96 in response to the temperature in the area to be conditioned to control the bleeding of air to the ambient through outlet means 78, 79.

Considering operation of the control arrangement under cooling conditions, cool conditioned air is supplied from central station 67 to each air distributing unit 2.

Assume that tab 113 has been moved to a desirable temperature setting to be maintained within the area 28, for example, a temperature of 75° F., rack 111 is moved causing rotation of gear 110 on shaft 107. Cam 108, which is also secured on shaft 107, rotates and pivots support 99 about shaft 100, thus suitably positioning bimetal 96 with respect to spindle 84 in valve body 76. When there is a demand for cooling; for example, when the room temperature rises above 75° due to an increased lighting load, the free end of bimetal 96 warps upwardly, as viewed in FIGURE 3, causing spindle 84 to move in a direction further opening ports 81 and 82. The bleeding of air through outlet means 78, 79 is increased and the pressure within the control chamber 40 and bladder 47 is reduced. Bladder 47 contracts and the area between the bladder and edges 25 and 26 is increased to permit more cool air to enter the area 28 being treated.

As the room cools to the desired temperature and cooling requirements decrease, bimetal 96 warps and spindle 84 is urged by spring 89 in a direction causing valve means 83 to close ports 81 and 82. The rate of air bleeding from outlet means 78, 79 is reduced. The pressure within regulator means 49 and bladder 47 will rise. Bladder 47 expands to reduce the area of the outlet, thus reducing the quantity of air discharged into area 28.

Considering the operation of the control system when heating is required warm conditioned air is supplied from central station 67 to each unit 2. It is contemplated that the valve means 83 and spindle 84 will be actuated by a suitable mechanism 128 such as a bellows or diaphragm responsive to the temperature of the conditioned air in duct 74 to permit maximum bleeding of control air to the atmosphere. Thermal sensor 129 disposed in conduit section 3 or in duct 74 transmits the temperature within the conduit section or duct to mechanism 128. It is contemplated that during heating operation mechanism 128 will expand and move spindle 84 causing valve means 83 to bleed the maximum quantity of control air to the atmosphere. In this mode of operation, bladder 47 collapses or contracts and the warm conditioned air discharges through the maximum outlet opening into area 28. Mechanism 128 may be a so-called "Vernatherm" element which expands in response to heat and contracts in response to cold. The "Vernatherm" element, disclosed, for example, in Patents No. 2,208,149, 2,368,181, and 2,636,776, comprises a power element extensible from its body at a predetermined temperature and contains a fusible, thermally expansible material, such as wax or wax embodied in a powdered heat conducting material and binder.

In another application it is contemplated that a dual-bleed venting means may be utilized to provide control during both heating and cooling operation. Essentially, the venting means 56 is duplicated, there being a first control valve and thermal-actuator for heating operation and a second control valve and thermal-actuator for cooling operation.

Considering now cooling operation of the modified control arrangement illustrated in FIGURE 2, cool conditioned air is supplied from the central station to conduit section 3 as before. Control valve 59' functions in the same fashion as control valve 59. Control air is supplied to wall-mounted thermostat 62 from a suitable source. Control air passes from inlet 122 through fixed orifice 123 into line 63 to pneumatic actuator 121. Bimetal 125, which is responsive to the temperature of the air within area 28, regulates the discharge of air through bleed port 124.

During heating operation it is contemplated that a suitable mechanism will be provided to render the pneumatic relay 61 inoperative such that the control valve 59' will permit maximum bleeding of air from line 55' to the atmosphere. As before, venting of regulator means 49, control chamber 40 and bladder or bellows 47 to the atmosphere causes the bladder to collapse and thus, during heating operation warm conditioned air discharges through the maximum outlet opening.

It is contemplated that the venting means 57' may be used to provide accurate control of bladder 47 during both heating and cooling. To accomplish this result, a reverse-actuating pneumatic thermostat, such as Minneapolis-Honeywell type TP–913A thermostat may be substituted for thermostat 60. During the summer operation a first control pressure, for example, 17 pounds per square inch, is supplied to the thermostat and during winter operation a second control pressure, for example, 13 pounds per square inch, is supplied to the thermostat. The thermostat is direct acting in response to the first control pressure and reverse acting in response to the second control pressure. The action of diaphragm 120 within actuator 121 is readily reversible and thus, it will be apparent that the control valve may be regulated by actuator 61 during both summer and winter operating conditions.

By this invention there is provided an improved air distributing unit including a bladder damper. The improved controls for the bladder damper comprise means for venting the bladder damper in response to the temperature in the area to be treated. The venting means function with precision in response to minute variation in temperature and are essentially independent of variation in control air pressure supplied to the venting means. The venting means are adapted to be mounted adjacent the air distributing unit or remote therefrom.

While I have described a presently preferred embodiment of the invention, it will be understood that the invention is not limited thereto since it may be otherwise embodied within the scope of the attached claims.

I claim:

1. In an air distributing unit for discharging conditioned air into an area to be treated, the combination of a casing, at least one plenum chamber in said casing, means for supplying conditioned air through one portion of the casing to said plenum chamber, means defining an outlet from said plenum chamber into the area to be treated, a damper arrangement including a bladder member associated with said outlet for controlling the discharge of conditioned air through said outlet into the area to be treated, regulator means in communication with said plenum chamber for supplying conditioned air at a pressure less than plenum chamber pressure to said bladder member, and means for venting the regulator means in response to predetermined conditions in the area being treated, said venting means comprising a housing having an inlet communicating with the regulator means and at least one outlet communicating with the ambient, valve means in said housing to regulate communication between the inlet and the outlet, said valve means including a bleed port, a valve member adapted to close said port, a stem carrying said valve member, and resilient means urging said valve member in a first direction, and temperature responsive means urging said valve member in an opposite direction, and adjustable support member for said temperature responsive means, first adjustment means for said support member, a pivotable member carrying said support member, and means to pivot said pivotable member thereby adjusting the position of said temperature responsive means.

2. In an air distributing unit for discharging conditioned air into an area to be treated, the combination of a casing, at least one plenum chamber in said casing, means for supplying conditioned air through one portion of the casing to said plenum chamber, means defining an outlet from said plenum chamber into the area to be treated, a damper arrangement including a bladder member associated with said outlet for controlling the discharge of conditioned air through said outlet into the area to be treated, regulator means in communication with said plenum chamber for supplying conditioned air at a pressure less than plenum chamber pressure to said bladder member, and means for venting the regulator means in response to predetermined conditions in the area being treated, said venting means comprising a housing having an inlet communicating with the regulator means and at least one outlet communicating with the ambient, valve means in said housing to regulate communication between the inlet and the outlet, said valve means including a bleed port, a valve member adapted to close said port, a stem carrying said valve member, and resilient means urging said valve member in a first direction, and temperature responsive means urging said valve member in an opposite direction, a frame, a first member pivoted on said frame, means for pivoting said first member, a support member for said temperature responsive means carried on said first member and means for adjusting the position of the support member on said first member.

3. In an air distributing unit for discharging conditioned air into an area to be treated, the combination of a casing, at least one plenum chamber in said casing, means for supplying conditioned air through one portion of the casing to said plenum chamber, means defining an outlet from said plenum chamber into the area to be treated, a damper arrangement including a bladder member associated with said outlet for controlling the discharge of conditioned air through said outlet into the area to be treated, regulator means in communication with said plenum chamber for supplying conditioned air at a pressure less than plenum chamber pressure to said bladder member, and means for venting the regulator means in response to predetermined conditions in the area being treated, said venting means comprising a housing having an inlet communicating with the regulator means and at least one outlet communicating with the ambient, valve means in said housing to regulate communication between the inlet and the outlet, said valve means including a bleed port, a valve member adapted to close said port, a stem carrying said valve member, and resilient means urging said valve member in a first direction, a pneumatic relay for urging said valve member in an opposite direction, a thermostat connected to said relay adapted to communicate with a source of control air and a temperature responsive bimetallic element operable in response to temperature variation in the area being treated to vary pressure of air imposed on the relay.

4. In control mechanism for use with an air distributing unit, the combination of a housing having an inlet adapted to be connected to a source of control air and at least one outlet communicating with the ambient, valve means in said housing to regulate communication between the inlet and the outlet, said valve means including a bleed port, a valve member adapted to close said port, a stem carrying said valve member and resilient means urging said valve member in a first direction and temperature responsive means urging said valve member in an opposite direction, an adjustable support member for said temperature responsive means, first adjustment means for said support member, a pivotable member carrying said support member and means to pivot said pivotable member thereby adjusting the position of said temperature responsive means.

5. In control mechanism for use with an air distributing unit, the combination of a housing having an inlet adapted to be connected to a source of control air and at least one outlet communicating with the ambient, valve means in said housing to regulate communication between the inlet and the outlet, said valve means including a bleed port, a valve member adapted to close said port, a stem carrying said valve member and resilient means urging said valve member in a first direction and temperature responsive means urging said valve member in an opposite direction, a frame, a first member pivoted on said frame, means for pivoting said first member, a support member for said temperature responsive means carried on said first member and means for adjusting the position of the support member on said first member.

References Cited in the file of this patent

UNITED STATES PATENTS

| | | |
|---|---|---|
| 1,763,666 | Machlet | June 17, 1930 |
| 2,486,573 | Pravda | Nov. 1, 1949 |
| 2,828,076 | Donahue | Mar. 25, 1958 |
| 2,839,248 | Edwards | June 17, 1958 |